(12) United States Patent
Heide et al.

(10) Patent No.: US 7,393,908 B2
(45) Date of Patent: Jul. 1, 2008

(54) CROSS-LINKED, WATER-SWELLABLE POLYMER AND METHOD FOR PRODUCING THE SAME

(75) Inventors: Wilfried Heide, Freinsheim (DE); Stefan Wickel, Bissersheim (DE); Thomas Daniel, Waldsee (DE); Uwe Stüven, Bad Soden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 105 days.

(21) Appl. No.: 10/399,185

(22) PCT Filed: Oct. 17, 2001

(86) PCT No.: PCT/EP01/12031

§ 371 (c)(1),
(2), (4) Date: Aug. 8, 2003

(87) PCT Pub. No.: WO02/32964

PCT Pub. Date: Apr. 25, 2002

(65) Prior Publication Data

US 2004/0014901 A1 Jan. 22, 2004

(30) Foreign Application Priority Data

Oct. 19, 2000 (DE) ................. 100 51 940

(51) Int. Cl.
*C08F 236/20* (2006.01)
*C08F 220/04* (2006.01)
*C08F 220/08* (2006.01)
*C08F 220/54* (2006.01)

(52) U.S. Cl. ............... 526/318.43; 526/303.1; 526/307.4; 526/307.5; 526/320; 526/323.1; 526/323.2

(58) Field of Classification Search ............ 526/318.43, 526/303.1, 307.4, 307.5, 320, 323.1, 323.2
See application file for complete search history.

(56) References Cited

U.S. PATENT DOCUMENTS

| | | | |
|---|---|---|---|
| 4,536,554 A * | 8/1985 | Lim et al. .................... | 526/264 |
| 4,769,427 A | 9/1988 | Nowakowsky et al. | |
| 5,837,789 A | 11/1998 | Stockhausen et al. | |
| 6,143,821 A | 11/2000 | Houben | |

FOREIGN PATENT DOCUMENTS

| | | |
|---|---|---|
| DE | 199 55 861.2 | 11/1999 |
| WO | WO 90/15830 | 12/1990 |
| WO | WO 9015830 A1 * | 12/1990 |

* cited by examiner

*Primary Examiner*—Kelechi C Egwim
(74) *Attorney, Agent, or Firm*—Mashall, Gerstein & Borun LLP

(57) ABSTRACT

The invention relates to a cross-linked, water-swellable polymer that contains polymerized into it moieties of
 a) water-soluble, monoethylenically unsaturated monomers, and
 b) 0.001 to 5 mole % based on the monomers a) of a cross-linking combination,
  b1) a frist cross-linking agent with at least two (meth) acrylic ester moieties in the molecule and
  b2) a second cross-linking agent with at least two (meth) allyloxy moieties in the molecule,
 the molar ratio of b1) to b2) ranging from 0.7:1 to 10:1.

The polymer according to the invention has a balanced property profile as regards absorptivity, gel strength, absorption speed and extractable componenets and can be advantageously produced by a continuous method.

6 Claims, No Drawings

CROSS-LINKED, WATER-SWELLABLE POLYMER AND METHOD FOR PRODUCING THE SAME

CROSS REFERENCE TO RELATED APPLICATION

This is the U.S. national phase application of International Application No. PCT/EP01/12031, filed Oct. 17, 2001.

The present invention relates to a crosslinked water-swellable addition polymer and to a process for producing it.

Crosslinked water-swellable addition polymers, which are also known as hydrogels or as superabsorbents, are capable of absorbing a multiple of their own weight of aqueous fluids. They are widely used in hygiene articles, such as diapers, sanitary napkins and the like. They contain polymerized units of water-soluble ethylenically unsaturated monomers, such as carboxylic acids, amides and the like. Incorporation of crosslinking sites in the addition polymer provides water-insoluble addition polymers. The degree of crosslinking determines not only the water solubility of the addition polymers, but also their absorptive capacity and gel strength. Gels having low gel strength are disadvantageous because they deform under an applied pressure, for example the bodyweight of a wearer, causing the pore structure of the addition polymer to collapse and to prevent further acquisition of fluid. Increased gel strength can be achieved by a higher crosslink density, but this reduces the absorptive capacity of the addition polymer.

A further criterion of water-swellable polymers is their extractable fraction. As the water-swellable addition polymers come into contact with body fluids, the extractable fractions are washed off, which causes the absorptive capacity to deteriorate. A further undesirable property of water-swellable polymers is gel-blocking. Gel-blocking occurrs when fluid wets the surface of the absorbing addition polymer particles and the outer sheath starts to swell. This leads to the formation of a barrier layer which makes it difficult for fluid to diffuse into the particle interior.

There is a need for water-swellable addition polymers which possess a proper balance of high absorbency, high gel strength, high acquisition rate (ie no gel-blocking) and low extractable fractions.

DE-A 196 46 484 describes fluid-absorbing polymers which are preparable using a crosslinker/monomer combination of three components, the first component being a compound having a (meth)allyl and a (meth)acrylic ester function, the second component being a mono(meth)acrylic ester or mono(meth)allyl alcohol ether of polyalkylene glycols and the third component being esters of unsaturated acids with polyols or di- or triallylamine or bisacrylamides.

WO 90/15830 discloses a water-swellable hydrocolloid polymer which contains 0.005 to 0.10 mol % of a polymerized crosslinker mixture which comprises a bis- or trisacryloyl-containing first crosslinker and a second crosslinker selected from bisallyl ethers, amides, amines and triallylamine, in a molar ratio of 1:1.5 to 1:15.

Water-swellable addition polymers can be prepared in an economical manner in a continuous process. For instance, EP-A-223 063 teaches a process for continuous production of crosslinked fine particles of polymer gel in a single-screw cylindrical mixer whose mixing segments cause the substances to be conveyed from the upstream to the downstream end of the cylindrical mixer.

DE 199 55 861.2 describes a process for continuous production of crosslinked fine particles of addition polymer gel by feeding an aqueous solution of water-soluble monoethylenically unsaturated monomers and crosslinkers into a mixing kneader having at least two axially parallel rotating shafts equipped with a plurality of kneading and transporting elements which convey the substances introduced from the upstream end to the downstream end of the mixer. The resulting heat of reaction is partly removed by evaporation of water, by product discharge and via cooling of the reactor walls.

When the production of water-swellable addition polymers is carried out in a mixing kneader, the mass undergoing addition polymerization is subjected to shearing forces which cause the mass to be divided to obtain a finely particulate addition polymer. The dividing creates new surfaces in the polymerizing mass which permit water evaporation and an attendant removal of heat of reaction. It has been determined that the divisibility of the polymerizing mass depends greatly on the composition of the monomer mixture. An unfavorable composition gives rise to lumpy or viscous masses in the course of the polymerization, whereas a favorable composition leads to masses which crumble apart to leave uniform fine granules.

It is an object of the present invention to provide crosslinked water-swellable addition polymers which have a balanced performance profile with regard to absorbency, gel strength, acquisition rate and extractables and which shall also be advantageously preparable in a continuous process.

We have found that this object is achieved by a combination of specific crosslinkers used in a specific mixing ratio.

The present invention accordingly provides a crosslinked water-swellable addition polymer containing polymerized units of a) water-soluble monoethylenically unsaturated monomers, and b) from 0.001 to 5 mol % based on the monomers a) of a crosslinker combination b1) of a first crosslinker containing at least two (meth) acrylic ester units in the molecule and b2) of a second crosslinker containing at least two (meth) allyloxy units in the molecule, the molar ratio of b1) to b2) being in the range from 0.7:1 to 10:1.

The present invention also provides a process for preferably continuous production of crosslinked water-swellable addition polymers, which comprises an aqueous solution of a) water-soluble monoethylenically unsaturated monomers, and b) from 0.01 to 5 mol % based on the monomers a) of a crosslinker combination b1) of a first crosslinker containing at least two (meth) acrylic ester units in the molecule and b2) of a second crosslinker containing at least two (meth) allyloxy units in the molecule, the molar ratio of b1) to b2) being in the range from 0.7:1 to 10:1.

having a solids content in the range from 20 to 80% by weight being subjected to a free-radically initiated addition polymerization with continuous input of shearing energy.

Water-soluble monoethylenically unsaturated monomers of group a) include for example ethylenically unsaturated $C_3$- to $C_6$-carboxylic acids, amides and esters with aminoalcohols of the formula I

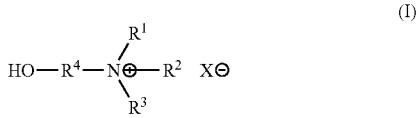

where $R^4$ is $C_2$ to $C_5$-alkylene and $R^1$, $R^2$, $R^3$ are independently hydrogen, methyl, ethyl or propyl. These compounds include for example acrylic acid, methacrylic acid, ethacrylic acid, α-chloroacrylic acid, crotonic acid, maleic acid, maleic anhydride itaconic acid, citraconic acid, mesaconic acid, glutaconic acid, aconitic acid and fumaric acid and the alkali metal and ammonium salts of these acids, acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate. The basic acrylates and methacrylates are used in the form of the salts with strong mineral acids, sulfonic acids or carboxylic acids or in quaternized form. The anion $X^-$ for the compounds of the formula I is the acid radical of the mineral acids or of the carboxylic acids or methosulfate, ethosulfate or halide from a quaternizing agent.

Further water-soluble monomers of group a) are N-vinylpyrrolidone, acrylamidopropanesulfonic acid, vinylphosphonic acid and/or alkali metal and ammonium salts of vinylsulfonic acid. The other acids may likewise be used in the polymerization either in non-neutralized form or in partially or up to 100% neutralized form. Useful water-soluble monomers of group a) also include N-vinylimidazolium compounds, such as salts or quaternization products of N-vinylimidazole and 1-vinyl-2-methylimidazole, and N-vinylimidazolines, such as N-vinylimidazoline, 1-vinyl-2-methylimidazoline, 1-vinyl-2-ethylimidazoline or 1-vinyl-2-n-propylimidazoline, which are likewise used in the polymerization in quaternized form or as salt.

It is further possible to use monoethylenically unsaturated sulfonic or phosphonic acids, for example allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, allylphosphonic acid, styrenesulfonic acid and 2-acrylamido-2-methylpropanesulfonic acid. The monomers can be used alone or mixed with each other.

Preferred monomers of group a) are acrylic acid, methacrylic acid and also the akali metal or ammonium salts of these acids, acrylamide and/or methacrylamide, further vinylsulfonic acid, acrylamidopropanesulfonic acid or mixtures thereof, for example mixtures of acrylic acid and methacrylic acid, mixtures of acrylic acid and acrylamidopropanesulfonic acid or mixtures of acrylic acid and vinylsulfonic acid. These monomers may be copolymerized with each other in any desired proportion.

The monomers of group a) are polymerized in the presence of a crosslinker combination b1) of a first crosslinker containing at least two methacrylic ester units in the molecule and b2) a second crosslinker containing at least two methallyloxy units in the molecule, the molar ratio of b1) to b2) being in the range from 0.7:1 to 10:1, preferably in the range from 1:1 to 7:1 and especially in the range from 3:2 to 5:1. The total amount of crosslinker is in the range from 0.001 to 5 mol % and preferably in the range from 0.005 to 0.5 mol % based on the monomers a).

Suitable crosslinkers b1) are generally (meth)acrylic esters of polyhydric alcohols which may have been alkoxylated with up to 100 and usually up to 50 ethylene oxide and/or propylene oxide units. Suitable polyhydric alcohols are in particular $C_2$-$C_{10}$-alkanepolyols having from 2 to 6 hydroxyl groups, such as ethylene glycol, glycerol, trimethylolpropane, pentaerythritol or sorbitol. Preferred crosslinkers b1) are polyethylene glycol diacrylate and polyethylene glycol dimethacrylates which are each derived from polyethylene glycols (which may be considered ethoxylated ethylene glycol) having a molecular weight from 200 to 2 000. Useful crosslinkers b1) further include trimethylolpropane triacrylate, trimethylolpropane trimethacrylate, ethylene glycol diacrylate, propylene glycol diacrylate, butanediol diacrylate, hexanediol diacrylate, hexanediol dimethacrylate or diacrylates and dimethacrylates of block copolymers of ethylene oxide and propylene oxide.

Useful crosslinkers b2) are in particular diallyl carbonate, allyl carbonates or allyl ethers of polyhydric alcohols which may have been alkoxylated with up to 100 and usually up to 50 ethylene oxide and/or propylene oxide units, and allyl esters of polybasic carboxylic acids.

Allyl carbonates of polyhydric alcohols conform to the general formula

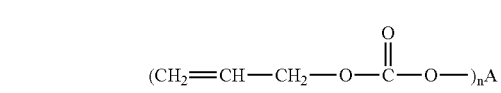

where

A is the radical of a polyhydric alcohol which may have been alkoxylated with up to 100 and usually up to 50 ethylene oxide and/or propylene oxide units; and n represents the hydricness of the alcohol, for example an integer from 2 to 10 and preferably from 2 to 5. A particularly preferred example of such a compound is ethylene glycol di(allyl carbonate). Also of particular suitability are polyethylene glycol di(allyl carbonate)s which are derived from polyethylene glycols having a molecular weight from 200 to 2 000.

Preferred examples of allyl ethers are: polyethylene glycol diallyl ethers which are derived from polyethylene glycols having a molecular weight from 200 to 2 000; pentraerythritol triallyl ether or trimethylolpropane diallyl ether. It is further possible to use reaction products of ethylene glycol diglycidyl ether or polyethylene glycol glycidyl ethers with 2 mol of allyl alcohol and/or pentaerythritol triallyl ether.

An example of a suitable allyl ester with polybasic carboxylic acid is diallyl phthalate.

The copolymerization of the monomers of groups a) and b) may—if a change in the properties of the copolymers is desired—be carried out in the additional presence of monomers of group c). Useful monomers of group c) include for example hydroxyethyl acrylate, hydroxypropyl acrylate, hydroxyethyl methacrylate, hydroxypropyl methacrylate, acrylonitrile and/or methacrylonitrile. Also useful are esters of acrylic acid or methacrylic acid with monohydric alcohols containing from 1 to 18 carbon atoms, eg methyl acrylate, ethyl acrylate, propyl acrylate, isopropyl acrylate, n-butyl acrylate, isobutyl acrylate, hexyl acrylate, 2-ethylhexyl acrylate, stearyl acrylate, the corresponding esters of methacrylic acid, diethyl fumarate, diethyl maleate, dimethyl maleate, dibutyl maleate, vinyl acetate and vinyl propionate. If the monomers of group c) are used for modifying the water-soluble polymers, up to 20, eg from 0.5 to 20, preferably from 2 to 10, mol % based on monomers a) are used.

The water-insoluble monomers, if used in the copolymerization, may be finely dispersed in the aqueous solution by means of emulsifiers. Useful emulsifiers include for example ethoxylated nonylphenols, ethoxylated castor oil, alkyl sulfates, sorbitan fatty esters, ethoxylated sorbitols, ethoxylated sorbitan fatty esters and alkylsulfonates. The emulsifiers are used in an amount of from 0 to 3% by weight based on the monomers a).

The polymerization may be carried out in the presence of customary polymerization regulators. Useful polymerization regulators include for example thio compounds, such as thioglycolic acid, mercaptoalcohols, eg 2-mercaptoethanol, mercaptopropanol and mercaptobutanol, dodecyl mercaptan, formic acid, ammonia and amines, eg ethanolamine, diethanolamine, triethanolamine, triethylamine, morpholine and piperidine.

The monomers a), b) and optionally c) are copolymerized with each other in from 20 to 80%, preferably from 20 to 50%, especially from 30 to 45%, by weight aqueous solution in the presence of polymerization initiators. Useful polymerization initiators include all compounds which decompose into free radicals under the polymerization conditions, for example peroxides, hydroperoxides, hydrogen peroxide, persulfates, azo compounds and redox catalysts. Preference is given to using water-soluble initiators. In some cases it is advantageous to use mixtures of various polymerization initiators, for example mixtures of hydrogen peroxide and sodium peroxodisulfate or potassium peroxodisulfate. Mixtures of hydrogen peroxide and sodium peroxodisulfate may be used in any proportion. Useful organic peroxides include for example acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, di(2-ethylhexyl)peroxydicarbonate, dicyclohexyl peroxydicarbonate, di(4-tert-butylcyclohexyl)peroxydicarbonate, dimyristyl peroxydicarbonate, diacetyl peroxydicarbonate, allyl peresters, cumyl peroxyneodecanoate, tert-butyl per-3,5,5-tri-methylhexanoate, acetylcyclohexylsulfonyl peroxide, dilauryl peroxide, dibenzoyl peroxide and tert-amyl perneodecanoate. Useful polymerization initiators further include water-soluble azo initiators, eg 2,2'-azobis(2-amidinopropane)dihydrochloride, 2,2'-azobis-(N,N-dimethylene)isobutyramidine dihydrochloride, 2-(carbamoylazo)isobutyronitrile, 2,2'-azobis-[2-(2'-imidazolin-2-yl)propane]dihydrochloride and 4,4'-azobis-(4-cyanovaleric acid). The polymerization initiators mentioned are used in customary amounts, for example in amounts from 0.01 to 5, preferably from 0.05 to 2.0% by weight, based on the monomers to be polymerized.

Useful initiators further include redox catalysts. In redox catalysts, the oxidizing component is at least one of the above-specified per compounds and the reducing component is for example ascorbic acid, glucose, sorbose, ammonium or alkali metal bisulfite, sulfite, thiosulfate, hyposulfite, pyrosulfite or sulfide, or metal salts, such as iron(II) ions or silver ions or sodium hydroxymethylsulfoxylate. The reducing component in the redox catalyst is preferably ascorbic acid or sodium pyrosulfite. Based on the amount of monomers used in the polymerization, from $1 \cdot 10^{-5}$ to 1 mol % is used of the reducing component of the redox catalyst. Instead of the oxidizing component of the redox catalyst it is also possible to use one or more water-soluble azo initiators.

The process of the invention is preferably carried out using a redox system of hydrogen peroxide, sodium peroxodisulfate and ascorbic acid. In a customary embodiment, these components are used in the concentrations of $1 \cdot 10^{-2}$ mol % hydrogen peroxide, 0.084 mol % sodium peroxodisulfate and $2.5 \cdot 10^{-3}$ mol % ascorbic acid based on the monomers.

The addition polymer is obtained by initiating the addition polymerization of the above monomers and exposing the polymerizing mass to shearing forces. Shearing forces may be suitably exerted on the polymerizing mass using trough kneaders or preferably continuous type mixing kneaders. Mixing kneaders comprise one or preferably two or more axially parallel rotating shafts bearing kneading and transporting elements which are effective in conveying the materials introduced at the upstream end of the mixing kneader in the axial direction toward the discharge opening at the downstream end.

Mixing kneaders useful in the process of the invention are obtainable from List and are described for example in CH-A-664 704, EP-A-517 068, WO 97/12666, DE-A-21 23 956, EP-A-603 525, DE-A-195 36 944 and DE-A-4 118 884.

Such kneaders with two shafts have such an arrangement for the kneading and transporting elements that a high self-cleaning effect is obtained, and this high self-cleaning effect is an important requirement for a continuous polymerization. The two shafts preferably contrarotate. The stirring shaft is fitted with disk segments in propeller fashion. Useful kneading and transporting elements include for example close-clearance mixing bars and L- or U-shaped attachments.

The mixing kneader may be heated or cooled as required. The monomer solution is polymerized therein at from 0 to 140° C. under atmospheric pressure. The temperature is preferably from 20 to 120° C., especially from 40 to 120° C. The maximum temperature in a preferred version of the process is not less than 70° C., particularly preferably not less than 80° C., especially not less than 90° C., the exit gas temperature not less than 60° C., particularly preferably not less than 80° C., especially not less than 90° C., and the product temperature at the point of discharge from the reactor not less than 60° C., particularly preferably not less than 75° C., especially not less than 85° C.

The heat of reaction due to the addition polymerization is removed by evaporation of water from the reaction mixture, by product discharge and, if necessary, cooling of the reactor walls subject to the proviso that the fraction of heat removed by evaporation of water is not less than 5% of the heat of reaction and the fraction of heat removed by product discharge is not less than 25% of the heat of reaction.

The process of the invention is preferably carried out in such a way that the fraction of heat removed by evaporation of water from the reaction mixture is not less than 30% and preferably not less than 40% of the heat of reaction.

Preference is given to processes wherein in total not less than 50%, more preferably not less than 70% and especially not less than 90% of the heat of reaction is removed by product discharge and water evaporation.

The use of a defined crosslinker combination in accordance with the processes of the invention even makes it possible to dispense with jacket cooling entirely. In this preferred version of the process, no heat is removed via the cooling of the reactor walls.

Whereas the monomer solution is liquid right at the start of the polymerization, the consistency of the reaction mixture changes via a highly viscous state into a crumbly gel. The polymerization produces a gel which is divided by the action of the shearing forces into a finely divided crumbly gel. When a continuous type mixing kneader is used, the gel is discharged at the downstream end of the mixer by the conveying action of the mixer. When a trough kneader is used, the kneader is switched off and emptied as soon as the gel has attained the desired consistency.

The aqueous monomer solution may contain the initiator in solution or dispersion. When a continuous type mixing kneader is used, the initiators may also be fed into the mixing kneader separately from the monomer solution.

Prior to polymerization, the monomer solution is preferably freed of residual oxygen. This is accomplished by means of inert gas, which may be introduced in cocurrent, in countercurrent or at entry angles in between. Good mixing may be obtained for example using nozzles, static or dynamic mixers or bubble columns.

When a continuous type mixing kneader is used, the monomer solution is passed through the reactor together with an inert gas stream. The mass throughput in terms of monomer solution is preferably not less than 1000, particularly preferably not less than 2000, especially not less than 3000, kg/hm$^3$ (reactor volume) and the inert gas flow is preferably not less than 100 l/hm$^3$ (reactor volume).

The inert gases used may be independently nitrogen, a noble gas such as argon, carbon monoxide, carbon dioxide, sulfur hexafluoride or a mixture thereof. The inert gas may be wholly or partly generated by a chemical reaction in the mixing kneader. The preferred inert gas is nitrogen.

The reactor volume may vary according to the conversion desired. The reactor volume is preferably not less than 0.1 m$^3$, particularly preferably from 0.2 to 20 m$^3$, especially from 0.2 to 12 m$^3$.

The gel obtained in the polymerization has a water content of from 0 to 80% by weight, preferably from 40 to 70% by weight. This relatively low moisture content of an already free-flowing gel which does not clump reduces the energy subsequently required for drying.

The production process is notable for short residence times in the reactor and hence for a good space-time yield. Even residence times of below 30 minutes in a reactor volume of 300 l give fine particles of polymer gel having a very low residual monomer content. This does away with the need for the otherwise necessary separation processes and increases the yield. Particular preference is given to process variants involving a high mass throughput which permits residence times of below 20 minutes and even below 10 minutes.

The performance characteristics of the addition polymers may be further improved by subsequently heating the addition polymer gels for several hours at from 50 to 120° C., preferably from 70 to 100° C. The polymer gel leaving the reactor is subsequently stored in a delay vessel at from 50 to 120° C., preferably at from 80 to 100° C. The delay time is generally from 0 to 3 hours, preferably from 5 to 30 minutes. The vessel can be open at the top, but it is also possible to use a closed vessel to which a slight vacuum is applied.

The drying step can be carried out according to all known processes, for example in a fluidized bed, on a through circulation drying belt, on a vacuum drying belt or with the aid of microwave drying, or preferably under reduced pressure in a single-screw kneader with intensive kneading of the polymer gel. This drying step is preferably carried out in a single- or multi-screw kneader at from 5 to 300, preferably from 20 to 70, mbar and at from 30 to 170° C.

The addition polymers obtained may preferably be surface postcrosslinked. Surface postcrosslinking may be carried out in a conventional manner using dried, ground and classified polymer particles.

To effect surface postcrosslinking, compounds capable of reacting with the functional groups of the addition polymers by crosslinking are applied onto the surface of the addition polymer particles, preferably in the form of an aqueous solution. The aqueous solution may contain water-miscible organic solvents as well as water. Suitable solvents are alcohols such as methanol, ethanol, isopropanol or acetone.

Suitable postcrosslinkers include for example:
di- or polyglycidyl compounds such as diglycidyl phosphonates or ethylene glycol diglycidyl ether, bischlorohydrin ethers of polyalkylene glycols,
alkoxysilyl compounds,
polyaziridines, aziridine compounds based on polyethers or substituted hydrocarbons, for example bis-N-aziridinomethane,
polyamines or polyamidoamines and also their reaction products with epichlorohydrin,
polyols such as ethylene glycol, 1,2-propanediol, 1,4-butanediol, glycerol, methyltriglycol, polyethylene glycols having an average molecular weight $M_w$ of 200-10 000, di- and polyglycerol, pentaerythritol, sorbitol, the ethoxylates of these polyols and their esters with carboxylic acids or carbonic acid such as ethylene carbonate or propylene carbonate,
carbonic acid derivatives such as urea, thiourea, guanidine, dicyandiamide, 2-oxazolidinone and its derivatives, bisoxazoline, polyoxazolines, di- and polyisocyanates,
di- and poly-N-methylol compounds such as, for example, methylenebis(N-methylolmethacrylamide) or melamine-formaldehyde resins,
compounds having two or more blocked isocyanate groups such as, for example, trimethylhexamethylene diisocyanate blocked with 2,2,3,6-tetramethylpiperidin-4-one.

If necessary, acidic catalysts may be added, for example p-toluenesulfonic acid, phosphoric acid, boric acid or ammonium dihydrogenphosphate.

Particularly suitable postcrosslinkers are di- or polyglycidyl compounds such as ethylene glycol diglycidyl ether, the reaction products of polyamidoamines with epichlorohydrin and 2-oxazolidinone.

The crosslinker solution is preferably applied by spraying with a solution of the crosslinker in conventional reaction mixers or mixing and drying equipment such as Patterson-Kelly mixers, DRAIS turbulence mixers, Lödige mixers, screw mixers, plate mixers, fluidized bed mixers and Schugi-Mix. The spraying of the crosslinker solution may be followed by a heat treatment step, preferably in a downstream dryer, at from 80 to 230° C., preferably at from 80 to 190° C., particularly preferably at from 100 to 160° C., for from 5 minutes to 6 hours, preferably from 10 minutes to 2 hours, particularly preferably from 10 minutes to 1 hour, during which not only cracking products but also solvent fractions can be removed. But the drying may also take place in the mixer itself, by heating the jacket or by blowing in a preheated carrier gas.

The crosslinker combination used according to the invention leads to water-swellable addition polymers possessing a combination of valuable hydrogel properties, such as high Absorbency Under Load and also low extractable fractions. The action of shearing forces in the course of the addition polymerization in the process of the invention provides addition polymer particles which possess an advantageous morphology. The addition polymer particles are obtained as a finely flaked product which possesses distinctly improved drying properties. As is shown by the comparative and inventive examples which follow, the polymerizing gel under the action of the shearing forces disintegrates into a finely divided powder in the course of the process according to the invention without further application of force from the outside.

Crosslinkers and crosslinker combinations which are not in accordance with the present invention lead to friable, tough or slimy products. The disintegration of the polymerizing mass generates new surfaces. As a result, the proportion of the heat of polymerization removed by cooling due to water evaporation increases. This leads to improved economics for the production process. As well as simplifying the production process, not only the drying operation but also the subsequent grinding operation are facilitated.

It is believed that the mode of action of the crosslinker combination used according to the invention rests on the different reactivities of the two types of crosslinker used. Crosslinker b1) possesses acrylic unsaturation, whereas the second crosslinker possesses allylic unsaturation. The reactivity of the former is substantially higher than that of the latter. It is believed that the acrylic crosslinkers rapidly and randomly react with the other monomers in the early phase of the polymerization to form highly crosslinked addition polymer islands. Owing to the lower reactivity of the allylic crosslinkers, sufficient crosslinker is available in the continued course of the polymerization in order that the highly crosslinked islands may be linked together via a wide-spaced mesh and broken bonds due to the action of the shearing forces in the production process of the present invention may be "cured".

The invention will now be illustrated by the inventive and comparative examples which follow. The following test methods were employed:

Centrifuge Retention Capacity (CRC)

This method determines the free swellability of the hydrogel in a teabag. CRC is determined by weighing 0.200±0.0050 g of dried hydrogel (particle size fraction 106-850 μm) into a teabag 60×85 mm in size, which is subsequently sealed. The teabag is placed for 30 minutes in an excess of 0.9% by weight sodium chloride solution (at least 0.83 l of sodium chloride solution/1 g of polymer powder). The teabag is then centrifuged at 250 g for 3 minutes. The amount of liquid retained by the hydrogel is determined by weighing back the centrifuged teabag.

Absorbency Under Load (AUL) 0.7 psi (4826.5 Pa)

The measuring cell for determining the AUL 0.7 psi is a Plexiglas cylinder 60 mm in internal diameter and 50 mm in height. Adhesively attached to its underside is a stainless steel sieve bottom having a mesh size of 36 μm. The measuring cell further includes a plastic plate 59 mm in diameter and a weight which can be placed in the measuring cell together with the plastic plate. The weight of the plastic plate and of the weight totals 1345 g. AUL 0.7 psi is determined by measuring the weight of the empty Plexiglas cylinder and of the plastic plate and recording it as $W_0$. Then 0.900±0.005 g of hydrogel-forming polymer (particle size distribution: 150-800 μm) is weighed into the Plexiglas cylinder and distributed very uniformly over the stainless steel sieve bottom. The Plexiglas plate is then carefully placed in the Plexiglas cylinder, the entire unit is weighed and the weight is recorded as $W_a$. Then the weight is placed on the plastic plate in the Plexiglas cylinder. A ceramic filter plate 120 mm in diameter and 0 in porosity is placed in the center of a Petri dish 120 mm in diameter and 30 mm in height and sufficient 0.9% by weight sodium chloride solution is introduced for the surface of the liquid to be level with the filter plate surface without the surface of the filter plate being covered. Then a round filter paper 90 mm in diameter and <20 μm in pore size (Schwarzband 589 from Schleicher & Schüll) is placed on the ceramic filter plate. The Plexiglas cylinder containing hydrogel-forming polymer is then placed together with the plastic plate and weight on top of the filter paper and left there for 60 minutes. At the end of this period, the complete unit is removed from the filter paper and the Petri dish and subsequently the weight is removed from the Plexiglas cylinder. The Plexiglas cylinder containing swollen hydrogel is weighed together with the plastic plate and the weight is recorded as $W_b$.

AUL 0.7 psi (4826.5 Pa) is calculated according to the following equation:

$$AUL\ 0.7\ psi\ [g/g] = [W_b - W_a]/[W_a - W_0]$$

Preparation of Addition Polymers

A 40% by weight monomer solution consisting of acrylic acid and sodium acrylate and having a 77 mol % degree of neutralization for the acrylic acid (specification of the acrylic acid: at least 99.5% by weight of acrylic acid, not more than 0.1% by weight of water, not more than 500 ppm of diacrylic acid, 180-200 ppm of monomethyl hydroquinone ether, <2000 ppm of acetic acid, <600 ppm of propionic acid). After neutralization, the mixture was aged for not more than 6 hours before being used for an addition polymerization. The addition polymerization was initiated using the following system:

0.005% by weight of hydrogen peroxide and 0.006% by weight of ascorbic acid and 0.28% by weight of sodium peroxodisulfate, all the percentages being based on the monomers present in the reaction solution, expressed as acrylic acid. The table below gives the amounts of crosslinker used (% by weight based on acrylic acid). The crosslinkers were mixed together with the aqueous monomer solution and this solution was inertized by passing nitrogen into it.

The individual components of this reaction solution (dilute aqueous solutions of hydrogen peroxide, ascorbic acid, sodium peroxodisulfate and the monomer/crosslinker solution) were metered separately into a kneading reactor (List ORP 250-Contikneter, from List, Arisdorf, Switzerland) and mixed therein in the course of being introduced into the reactor, the addition polymerization speedily ensuing in the course of the mixing.

600 kg/h of reaction solution were introduced, and the gel produced in the kneader by addition polymerization was continuously discharged. The temperature of the cooling water in the reactor jacket was closed-loop controlled to 90° C. During the addition polymerization, 14 $m^3$/h of nitrogen were passed through the kneader as an inert gas. The reaction volume was 300 l.

The discharged gel was dried, ground and sieved to a particle size fraction of 100-800 μm. The Centrifuge Retention Capacity and the extractable fractions are reported in the table.

Surface Postcrosslinking:

A Waring lab mixer with mixing attachment and blunted mixing blades was charged with 20 g of polymer (particle size fraction 100-800 μm). While the mixer was turning at slow speed, 1 g of postcrosslinking solution (containing 12 mg of ethylene glycol diglycidyl ether dissolved in a mixture of 33% by weight of 1,2-propylene glycol and 67% by weight of water) was metered in. The moist polymer powder was subsequently removed from the mixer and dried in a Petri dish in a through-circulation cabinet at 150° C. for 60 minutes. After the coarse fraction (800 μm) had been sieved off, the product obtained was tested. The results are reported in the table.

TABLE

| | Crosslinker 1 | Crosslinker 2 | Gel consistency | Base polymer | | Postcrosslinked polymer | | | | |
|---|---|---|---|---|---|---|---|---|---|---|
| | | | | CRC | Ext. 16 h | pH | CRC | AUL 0.5 psi | AUL 0.7 psi | Ext. 16 h |
| Comp. Ex. 1 | PEGDA-400 0.50% | none | friable, yellowish | 33.5 | 9.4% | 6.07 | 31.1 | 28.3 | 25.5 | 7.5% |
| Comp. Ex. 2 | Tetraallyloxyethane 0.50% | none | very lumpy | 44.4 | 34.4% | | | | | |
| Inv. Ex. 1 | PEGDA-400 0.40% | P-30, 0.10% | flaky, white | 26.8 | 4.0% | 5.87 | 24.9 | 25.3 | 24.1 | 2.4% |
| Inv. Ex. 2 | PEGDA-400 0.40% | AC, 0.10% | flaky, white | 30.7 | 6.6% | 6.05 | 27.7 | 27.4 | 25.0 | 3.9% |
| Inv. Ex. 3 | PEGDA-400 0.40% | PEG-AA-400 0.10% | flaky, white | 32.9 | 8.8% | 6.04 | 28.2 | 28.2 | 25.0 | 5.7% |

PEGDA-400 = polyethylene glycol diacrylate 400
PEG-AA-400 = polyethylene glycol diallyl ether 400
P-30 = pentaerythritol triallyl ether
AC = diethylene glycol bis(allyl carbonate)

We claim:

1. Crosslinked water-swellable addition polymer consisting of polymerized units of
   a) a water-soluble monoethylenically unsaturated monomer selected from the group consisting of acrylic acid, methacrylic acid, ethacrylic acid, α-chloroacrylic acid, crotonic acid, maleic acid, maleic anhydride, itaconic acid, citraconic acid, mesaconic acid, glutaconic acid. aconitic acid, fumaric acid, an alkali metal salt or ammonium salt of these acids, acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate, dimethylaminoneopentyl methacrylate, and mixtures thereof,
   b) from 0.001 to 5 mol % based on the monomers a) of a crosslinker combination
      b1) of a first crosslinker containing at least two (meth)acrylic ester units in the molecule and
      b2) of a second crosslinker containing at least two (meth)allyloxy units in the molecule,
   the molar ratio of b1) to b2) being in the range from 3:2 to 5:1, and
   c) and up to 20 mol %, based on the monomers a), of a monomer selected from the group consisting of hydroxyethyl acrylate, hydroxypropyl acrylate, hydroxyethyl methacrylate, hydroxypropyl methacrylate, acrylonitrile, methacrylonitrile, an ether of acrylic acid or methacrylic acid with a monohydric alcohol having 1 to 18 carbon atoms, diethyl fumarate, diethyl maleate, dimethyl maleate, dibutyl maleate, vinyl acetate, and vinyl propionate.

2. Polymer as claimed in claim 1, wherein the monomer a) is selected from the group consisting of acrylic acid, methacrylic acid, alkali metal or ammonium salts of these acids, acrylamide methacrylamide, and mixtures thereof.

3. Polymer as claimed in claim 1 or 2, wherein the first crosslinker is selected from the group consisting of (meth)acrylic esters of polyhydric alcohols alkoxylated with up to 100 ethylene oxide and/or propylene oxide units.

4. Polymer as claimed in claim 3, wherein the polyhydric alcohol is selected from the group consisting of ethylene glycol, glycerol, trimethylolpropane, pentaerythritol, sorbitol, and mixtures thereof.

5. Polymer as claimed in claim 1 or 2, wherein the second crosslinker is selected from the group consisting of diallyl carbonate, allyl carbonates and allyl ethers of polyhydric alcohols optionally alkoxylated with up to 100 ethylene oxide and/or propylene oxide units, and allyl esters of polybasic carboxylic acids.

6. Crosslinked water-swellable addition polymer consisting of polymerized units of
   a) a water-soluble monoethylenically unsaturated monomer selected from the group consisting of acrylic acid, methacrylic acid, alkali metal or ammonium salts of these acids, and mixtures thereof, and
   b) from 0.001 to 5 mol % based on the monomers a) of a crosslinker combination
      b1) of a first crosslinker containing at least two (meth)acrylic ester units in the molecule and
      b2) of a second crosslinker containing at least two (meth)allyloxy units in the molecule,
   the molar ratio of b1) to b2) being in the range from 3:2 to 5:1.

* * * * *

UNITED STATES PATENT AND TRADEMARK OFFICE
CERTIFICATE OF CORRECTION

PATENT NO. : 7,393,908 B2  Page 1 of 1
APPLICATION NO. : 10/399185
DATED : July 1, 2008
INVENTOR(S) : Wilfried Heide et al.

It is certified that error appears in the above-identified patent and that said Letters Patent is hereby corrected as shown below:

On the Title Page

Item (74), "Mashall" should be -- Marshall --.

Item (57), line 7, "frist" should be -- first --.

At Column 11, line 30, "glutaconic acid." should be -- glutaconic acid, --.

Signed and Sealed this

Eleventh Day of November, 2008

JON W. DUDAS
*Director of the United States Patent and Trademark Office*